ис009720423B2

(12) United States Patent
Beck (10) Patent No.: US 9,720,423 B2
(45) Date of Patent: Aug. 1, 2017

(54) APPARATUS AND METHOD FOR PROCESS CONTROL

(71) Applicant: Buerkert Werke GmbH, Ingelfingen (DE)

(72) Inventor: Klaus Beck, Gommersdorf (DE)

(73) Assignee: Buerkert Werke GmbH, Ingelfingen (DE)

( * ) Notice: Subject to any disclaimer, the term of this patent is extended or adjusted under 35 U.S.C. 154(b) by 1046 days.

(21) Appl. No.: 13/651,571

(22) Filed: Oct. 15, 2012

(65) Prior Publication Data

US 2013/0103209 A1    Apr. 25, 2013

(30) Foreign Application Priority Data

Oct. 14, 2011    (DE) .................. 10 2011 115 896

(51) Int. Cl.
| | |
|---|---|
| G05D 9/00 | (2006.01) |
| G05D 7/00 | (2006.01) |
| G05D 7/06 | (2006.01) |
| G05B 11/06 | (2006.01) |
| G05B 13/02 | (2006.01) |

(52) U.S. Cl.
CPC .......... G05D 7/0635 (2013.01); G05B 11/06 (2013.01); G05B 13/024 (2013.01)

(58) Field of Classification Search
CPC . G05B 13/04; G05D 7/06; G05D 1/00; G05D 7/00; F16K 37/00; B60T 7/12; F02B 47/08; F02M 25/07
USPC ................. 700/282, 302, 28, 29, 30, 56, 90; 701/10; 702/1, 33, 34, 85, 94, 97, 105, 702/108, 113, 114, 118, 127, 182; 251/129; 137/1, 55, 48; 73/9
See application file for complete search history.

(56) References Cited

U.S. PATENT DOCUMENTS

| | | | | |
|---|---|---|---|---|
| 6,155,283 | A  * | 12/2000 | Hansen et al. | 137/1 |
| 6,272,401 | B1 * | 8/2001 | Boger et al. | 700/282 |
| 7,349,745 | B2 * | 3/2008 | Junk | 700/1 |

(Continued)

FOREIGN PATENT DOCUMENTS

| | | |
|---|---|---|
| DE | 3717555 A1 | 12/1988 |
| DE | 69820469 T2 | 12/2003 |
| DE | 102007001186 B4 | 7/2008 |

OTHER PUBLICATIONS

English translated Chinese office action dated Aug. 28, 2014.
German Search Report dated Oct. 5, 2012.

*Primary Examiner* — Mohammad Ali
*Assistant Examiner* — Md Azad
(74) *Attorney, Agent, or Firm* — Carlson, Gaskey & Olds, PC (57) ABSTRACT

A method and a device for open-loop or closed-loop control of a process uses an actuator, a position sensor, a process valve, a process sensor, and a tuning stage. n positions of the process valve are approached, and the associated actual position values are detected. The respective actual process values are detected for each corresponding actual position value to thus obtain value pairs of actual position values and actual process values. Correction values are calculated based on the identified value pairs, and position set values corrected with the correction values are determined to compensate for nonlinearities of the process, such that a linear overall behavior is achieved.

8 Claims, 6 Drawing Sheets

(56) References Cited

U.S. PATENT DOCUMENTS 8,352,087 B2 1/2013 Yli-Koski
2009/0125154 A1* 5/2009 Yli-Koski .................... 700/282

* cited by examiner

APPARATUS AND METHOD FOR PROCESS CONTROL

TECHNICAL FIELD

The invention relates to a device and to a method for a closed-loop and open-loop control of processes.

BACKGROUND OF THE INVENTION

In the automation of process engineering procedures, microcontroller-based measuring, open-loop and closed-loop control devices are employed. For economical reasons, an increasing importance must be attached to the automated, optimal adaptation to the process, apart from the base function according to its purpose. A widely-used closed-loop control device for process engineering procedures is the electro-pneumatic positioner for the continuous influence of fluid flows by means of a process valve or a regulating valve. This positioner is generally integrated in a superordinate process control loop in the form of a cascade and takes the role of the secondary auxiliary controller. The superposed process controller controls the secondary positioner, which in turn influences the process to be controlled by means of the regulating valve. The feedback of the actual process value using the process sensor closes the superposed process control loop. For different reasons, a nonlinear operating characteristic often occurs in the process to be controlled, which leads to a reduction in the control accuracy when a mostly linear PID-process controller is used. An improvement can be achieved by linearizing the operating characteristic by means of a correction characteristic. Firmly predetermined characteristic forms (equal percentage 1:25, 1:50, . . . ) or forms of characteristics which can be parameterized by value pairs are provided as correction characteristics. In the last case, the manual input of value pairs is realized. However, the drawbacks of the known methods consist in that the linearization takes place only in an approximate manner on the basis of predetermined forms of characteristics, or in that a complex manual determination of a free correction characteristic is necessary. This in turn results in a reduced control accuracy due to the insufficient or missing linearization. Furthermore, in case a wrongly dimensioned process valve is used in the control loop, the process control loop is only apparently optimized during the linearization, though no optimal result can be achieved.

Thus, a device and a method are provided for an open-loop or closed-loop control of a process, which permits compensation for nonlinearities.

SUMMARY OF THE INVENTION

In one example, a method for an open-loop or closed-loop control of a process using an actuating means, a position sensor, a process valve, a process sensor, and a tuning stage is provided.

One example method is described in detail below for the case of a closed-loop control. The method then additionally comprises a process controller and a positioner, the process controller and the positioner being adapted to be combined to a process control apparatus.

The process controller continuously outputs a position set value to the positioner, the position set value correlating with a position of the process valve. The position set value is here in a range which corresponds to a valve position between a completely open and a completely closed position. An appropriate sensor (e.g. a position sensor) can then detect and output the actual position values of the process valve. A process sensor detects an actual process value PV which is fed back to the process controller. The process sensor may be, for example, a temperature detector Pt100, the output signal of which is sent directly to the process controller. Alternatively, the process sensor may however also comprise a transmitter which forwards a converted or normalized sensor signal to the process controller. Typical process sensors measure a physical quantity of a medium, such as flow, pressure, temperature, pH-value or conductivity. Using the actual position values of the process valve and the actual process values, it is then possible to determine corrected position set values by which the process is linearized. Due to mostly nonlinear connections between the process valve position and the actual process value, the position set value generated by the process controller is thus adapted by use of the method to obtain a corrected position set value. A linearization of the respective process is therefore realized.

Here, the position control loop and the process as well as the process sensor are at first connected with a tuning stage, the superordinate process control loop being thus interrupted. The tuning stage (automatically) outputs n position set values to the positioner. These n position set values cover a range from a closed to an open position of the process valve. The actual process value associated with each actual position value is then detected using the process sensor to thus obtain n value pairs of actual position values and actual process values. The detected n value pairs are provided for the process controller.

The tuning stage may also be configured such that a complete correction characteristic is calculated based on the n pairs of actual position values and actual process values.

After the determination of these n value pairs, the position control loop, the process and the process sensor along with the process controller are closed to the process control loop. In the process controller or the tuning stage, correction values (correction characteristic) are determined on the basis of the identified value pairs of actual position values and actual process values, so that using the correction values, it is possible to calculate corrected position set values directly on the process controller. The corrected position set values then serve to compensate for the nonlinearities of the process, such that a linear overall behavior is obtained. Contrary to conventional process control loops, the correction of any nonlinearities of the control loop thus takes place automatically and in one step, more specifically directly on the process controller. As a result, the overall control accuracy is increased. The correction procedure can be performed again in case of modifications of the process, or modifications or exchange of components of the process control loop.

In the context of the present invention, in the case of the closed-loop process control, the positioner is a constituent of a position control loop. The latter includes the positioner, an actuating system, the process valve (for example a continuous valve) and a position sensor which are mounted as a position control loop in a closed loop. Here, the current position (i.e. the actual position value) of the pneumatic drive of the process valve, for example, is detected by the position sensor. The actual position value is compared with the position set value predetermined as a standard signal. If there is a deviation, the latter is compensated by aerating and de-aerating the drive via the actuating system. In this way, the position of the drive is changed up to a deviation of zero. The position control loop is furthermore integrated in a process control loop and thus becomes the subordinate auxiliary control loop. This results in a so-called cascade control. The process control loop then includes for example the process controller, the position control loop, the process from which a process variable or a process parameter is fed back to the process controller, for example, by use of the process sensor. If there is a deviation between the process variable and the process set value, the latter is compensated for in the process control loop. In this situation, the process control loop is the main control loop. The process controller in the process control loop may, for example, have a PID function (Proportional Integral Derivative Controller; a controller having a proportional element, an integral member, and subtraction). The process set value is specified as a set value. This actual process value is detected by sensors and, if necessary, transmitters. The actual process value is compared by the process controller with the set value predefined thereby. If there is a deviation, the position set value for the positioner is modified so that the drive of the process valve is adjusted by the actuating system until, in the ideal case, the deviation of zero is achieved in the process control loop.

Advantageously, according to one aspect of the invention, when determining corrected position set values based on the identified value pairs of actual position values and actual process values, a complete correction characteristic is thus immediately identified. A person skilled in the art knows different algorithms which can be used for linearization. According to this aspect of the invention, a transformation of the identified value pairs of actual position values and actual process values to a corresponding correction characteristic is thus realized such that the series connection of correction and process characteristics leads to a linear overall behavior. In this way, all position set values can be corrected with respect to an optimal linearity, which results in an improvement of the control accuracy.

Furthermore, according to one example of the invention, an analysis of the detected value pairs (POS/PV) composed of an actual position value and an actual process value, and/or of the correction characteristic identified therewith can take place. For example, the ratio between corrected position set values and uncorrected position set values or the maximum and/or minimum values of the actual process values may, e.g., be examined whether they are within specific limits. This can be used to evaluate the properties of the process valve. Here, in particular the dimensioning aspects of the process valve, such as flow characteristic value and control characteristic are considered. The control characteristic may for example be influenced by the geometry of a throttle body in the process valve. The result of the analysis and the evaluation of the automatically identified correction characteristic can then for example be reported back to the user to prevent or eliminate errors in the dimensioning of the process control loop.

The invention also provides a device, for example, a process control apparatus having an integrated process controller and a positioner for controlling a process in a closed loop. An actuating system and a position sensor are further provided. During normal operation, the process controller receives a process set value and an actual process value detected by the process sensor, the actual process value correlating with a valve position. The process controller determines a position set value on the basis of the process set value and the actual process value, which is output to the positioner. The positioner further receives an actual position value output therefor by the position sensor, which in turn is coupled to the process valve. The positioner determines on the basis of the position set value and the actual position value driving values forwarded to the actuating system, which in turn is coupled to the process valve. In accordance with the deviation between the position set value and the actual position value, an aeration or de-aeration of the process valve may then be performed by the actuating system.

The device further comprises a tuning stage adapted to determine correction values using pairs of actual position values and actual process values, to obtain corrected position set values and to thus achieve a linearization of the respective process.

The tuning stage can further be arranged such that it outputs for its part position set values corresponding to the actual position values of the process valve. The approached actual position values can in particular range from a closed to an open position of the process valve.

Advantageously, a switchover device is provided to output the position set values from the tuning stage to the positioner, or corrected position set values from the process controller to the positioner.

The corrected position set values are then output by the process controller. In other words, the correction of the nonlinearity of the process takes place in, or directly on, the process controller. A correction characteristic (correction values) can be stored there, by which a corrected position set value is calculated for the respective position set value. If the correction characteristic is stored, the latter can be adapted in case of modifications on the system (modifications of the process or of components of the control loops (auxiliary and main control loop)) by executing the tuning procedure again using the tuning stage. In case a plurality of process control loops are present, they can adapt the correction characteristic, according to one example of the invention, autonomously or by order in case of modifications of the system parameters, and each control loop can achieve for itself an optimization of the control accuracy by linearization. Errors in the valve dimensioning or also other errors can at the same time be reported.

The method can of course be employed in an analogous manner for the open-loop control of processes. The process controller is then omitted. The method may also determine the correction characteristic without using a positioner. Here, n positions are at first approached in the process valve, for example in a timed manner, which are then detected by a position sensor. The actual process values for each position of the process valve are detected by the process sensor, and n value pairs are formed of the actual position value (POS) and the actual process value (PV), which are sent to the tuning stage. The further procedure is identical, as described above for the case of a closed-loop control.

BRIEF DESCRIPTION OF THE DRAWINGS

Further features and advantages of the invention will become apparent from the description below of the preferred example embodiments of the invention with reference to the accompanying figures, in which.

DETAILED DESCRIPTION

Figure 1:
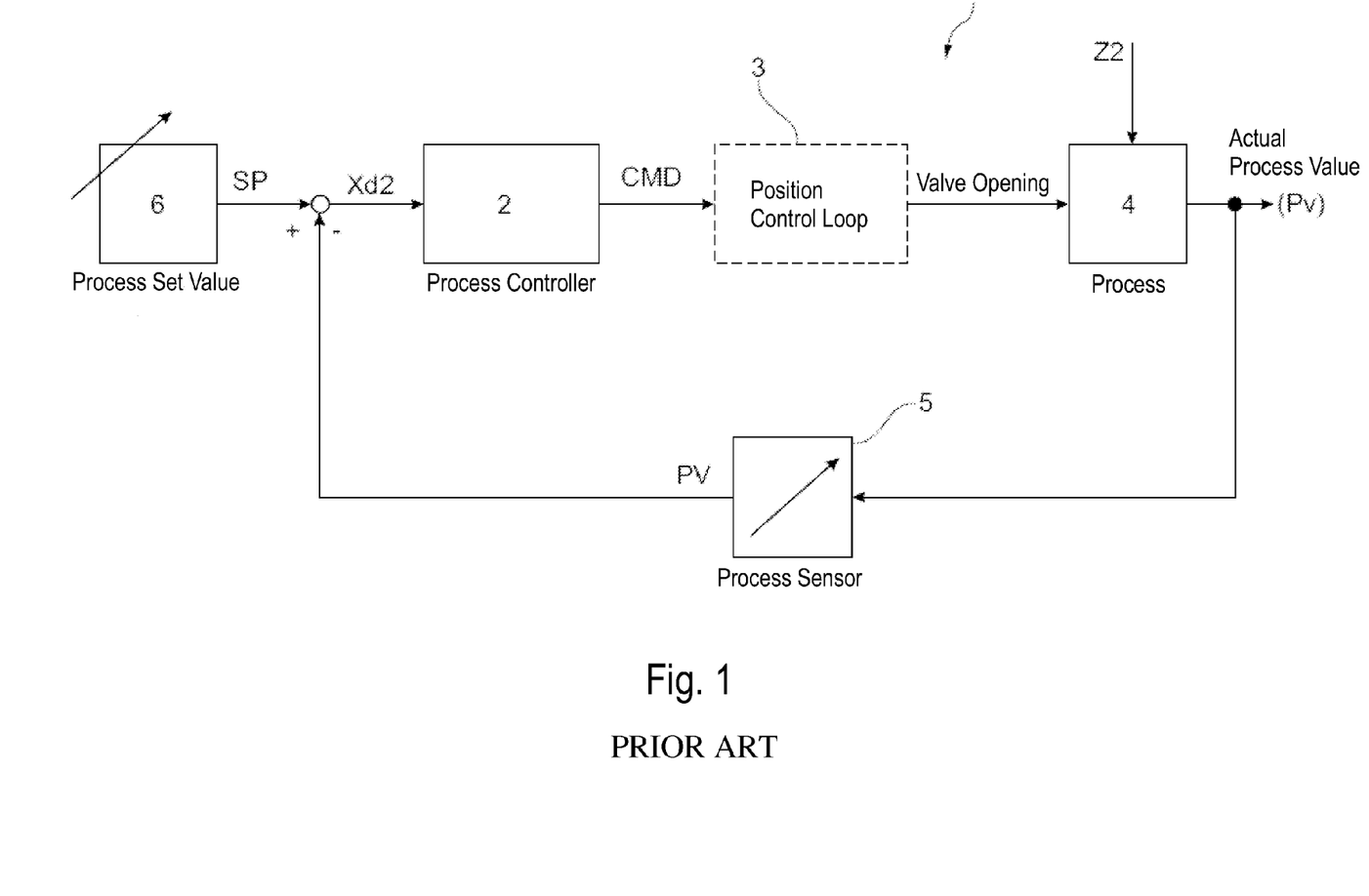
FIG. 1 is a diagram of a process control loop according to the prior art.

FIG. 1 shows a simplified block diagram of a process control loop 1 according to the prior art. The process control loop 1 includes a process controller 2, a position control loop 3, the process 4 and a process sensor 5. The process set value SP is predetermined by a stage 6. The process variable PV is derived by the process and corresponds to the actual process value. The difference between the process set value SP and the actual process value PV is the deviation Xd2. The deviation Xd2 is transmitted to the process controller 2 which outputs a position set value CMD based thereon to the position control loop 3. The position control loop acts on the process 4 and thus on the actual process value PV by way of the valve opening. The current actual process value PV is derived by the process 4, detected by the process sensor 5, and fed back to the input of the process controller 2. The process sensor can directly transmit signals to the process controller 2 or via a transmitter. In this example embodiment, the process controller 2 in the process control loop 1 (main control loop) may have a PID function. All in all, the deviation Xd2 is minimized by the control loop. Z2 represents a disturbance variable.

Figure 2:
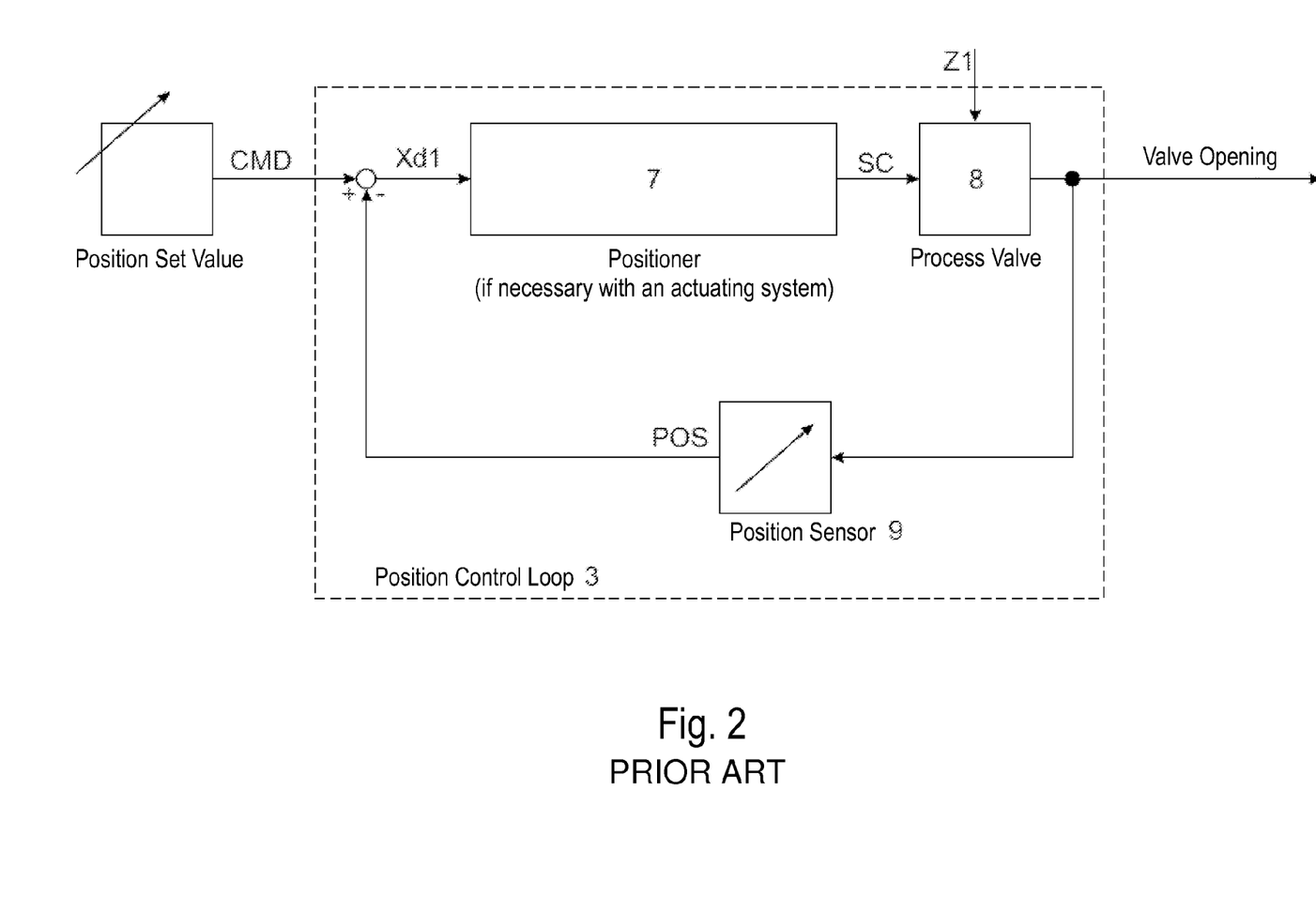
FIG. 2 shows a simplified diagram of a position control loop according to the prior art.

FIG. 2 shows a position control loop 3 according to the prior art, as can also be used in accordance with the invention. The position control loop 3 is an auxiliary control loop as used in the process control loop 1 according to FIG. 1. The position control loop 3 includes a positioner 7 which may for example also comprise an actuating system for a specific process valve. The positioner 7 outputs a control signal SC to the drive of the process valve 8. This results in a specific valve opening of the process valve 8. The actual position value POS of the drive of the process valve 8 can be identified by a position sensor 9. This actual position value POS is compared with the position set value CMD predetermined from outside by the process controller 2. A deviation Xd1 is thus identified, which in turn is converted 7 into a corresponding control signal SC for the process valve 8 by the positioner 7.

All in all, this thus results in a cascade-shaped configuration of a process control loop 1 having a position control loop 3, as is also used according to the aspects of the present invention.

Figure 3:
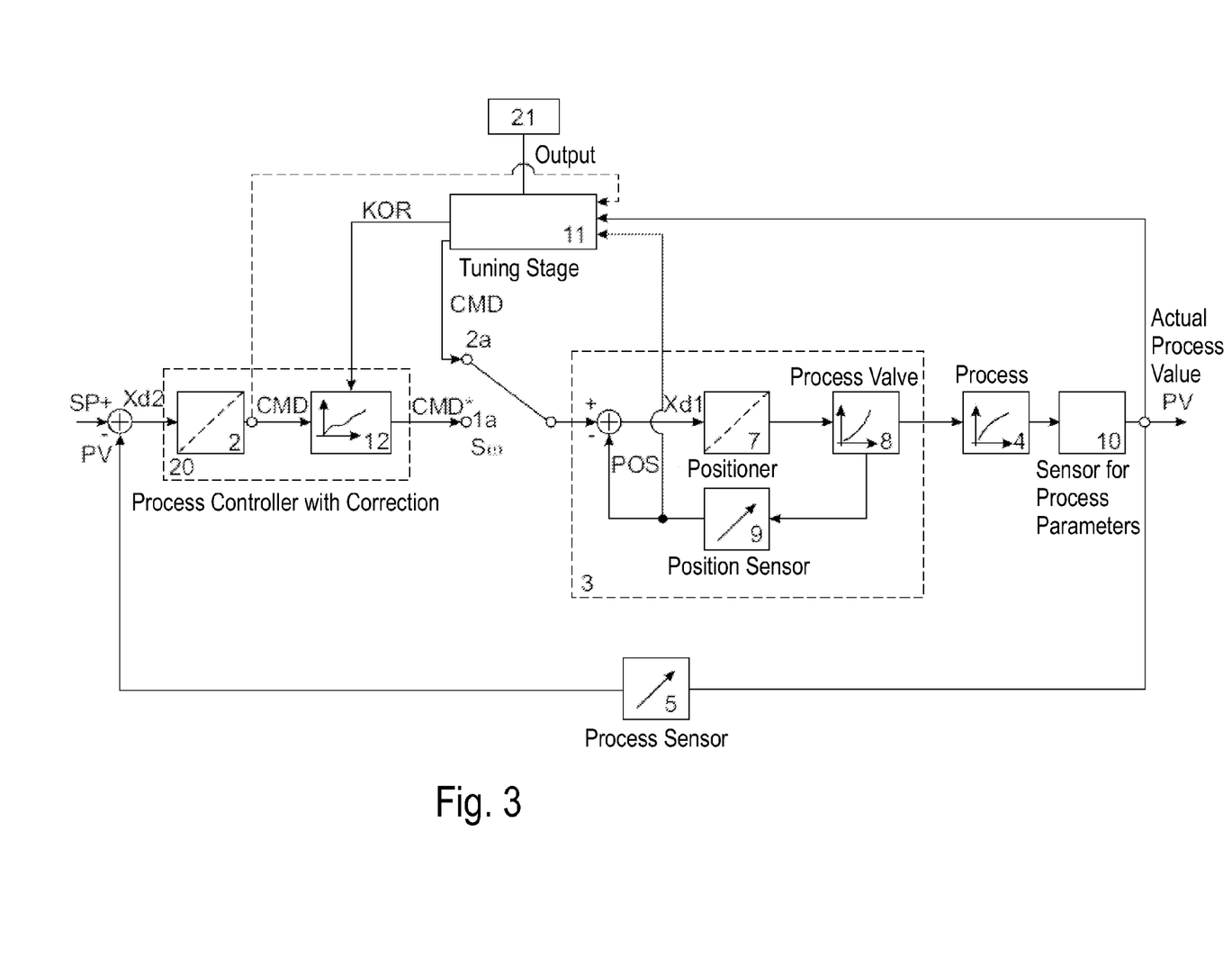
FIG. 3 shows a process control loop having an integrated position control loop according to aspects of the present invention.

FIG. 3 shows a simplified block diagram of an example embodiment of the invention. The process control loop includes again the process controller 20, which is modified or supplemented according to the aspects of the invention. Furthermore, the position control loop is provided as an auxiliary control loop 3 in the process control loop, which is coupled to the process 4. The process 4 detects an actual process value PV by use of a process sensor 10. PV is sent back to the process controller 20 where it is compared with the process set value SP and where a deviation Xd2 is determined.

According to the aspects of the invention, a switchover device SW is however now additionally provided, which can separate the process controller 20 from the position control loop 3 or from the positioner 7. To this end, the switchover device has two switch positions 1a and 2a. In position 1a, the process control loop is closed, and the process control is performed with the corrected position set values CMD*. In position 2a, the tuning procedure is performed by the tuning stage 11. Instead of the process controller 20, the tuning stage 11 may then output a number of, e.g., n position set values CMD, to the position control loop. This procedure may take place, for example, at the beginning or after the arrangement and setup of the process control loop. The procedure may however also be repeated at regular intervals. The n position set values CMD output by the tuning stage 11 thus cover a range extending from an open position of the process valve 8 to a closed position of the process valve 8. For each of the n position set values CMD output by the tuning stage 11, a process variable or an actual process value PV is determined by the process sensor 10 in the process 4. n pairs (POS/PV) are formed of the actual position values POS and the associated actual process values PV. The tuning stage 11 is furthermore set up to calculate correction values from these n value pairs (POS/PV), by which corrected position set values CMD* can be calculated. In a simple abstract representation, these correction values are the quotients of the corrected position set value CMD* and the uncorrected position set value CMD, i.e. CMD*/CMD. If, for example, the position set values CMD are multiplied by this quotient CMD*/CMD in the process controller 20, the corrected position set values CMD* are obtained.

The tuning stage 11 can be arranged to determine a complete correction characteristic based on the value pairs CMD, PV, which compensates for the nonlinearities of the process 4 including any further nonlinear influences (position control loop, process valve, position sensor, process sensor signals, etc.). When the complete correction characteristic is calculated, the tuning stage 11 sends the set of parameters KOR, i.e. the correction values calculated from the determined value pairs, to the process controller 20. Alternatively, the tuning stage 11 may also output signals KOR. To this end, the tuning stage 11 must obtain the position set values CMD. This is drawn in FIG. 3 as an additional dashed line. The correction characteristic may also be present in the form of parameters. The process controller 20 is now adapted in accordance with the correction characteristic, so that the new position set values CMD* are obtained. According to this example embodiment, a correction stage 12 is provided which is connected downstream of the conventional process controller 2. The correction values (e.g. CMD*/CMD) or the complete correction characteristic and/or the parameters thereof are filed (stored) in the correction stage. The uncorrected position set values CMD are converted into corrected position set values CMD* in the correction stage 12. As a result, the entire process control is linearized. The correction of the position set values or the linearization takes place directly in or on the process controller.

As soon as the tuning procedure is completed by the tuning stage 11, the process controller 20 is coupled again to the position control loop 3 (switch position 1a), so that the process control loop is closed again for normal operation and now operates with the corrected position set values CMD*.

The tuning stage is further set up to examine (analyze) the detected actual process values PV and the associated actual position values POS as value pairs, or the correction values KOR in combination or in relation to each other with respect to specific criteria, and to derive therefrom whether, for example, the process valve 8 has the correct dimensions. In case an error is detected in this analysis, the latter can be reported via an output 21. This can be a bus or a display. An error may, for example, be identified by the fact that the actual process values for specific actual position values exceed a predetermined normal range. Here, minimum and maximum values could for example be analyzed. This analysis may also be performed with the correction values KOR or the correction characteristic, or with parameters derived therefrom.

Figure 4:
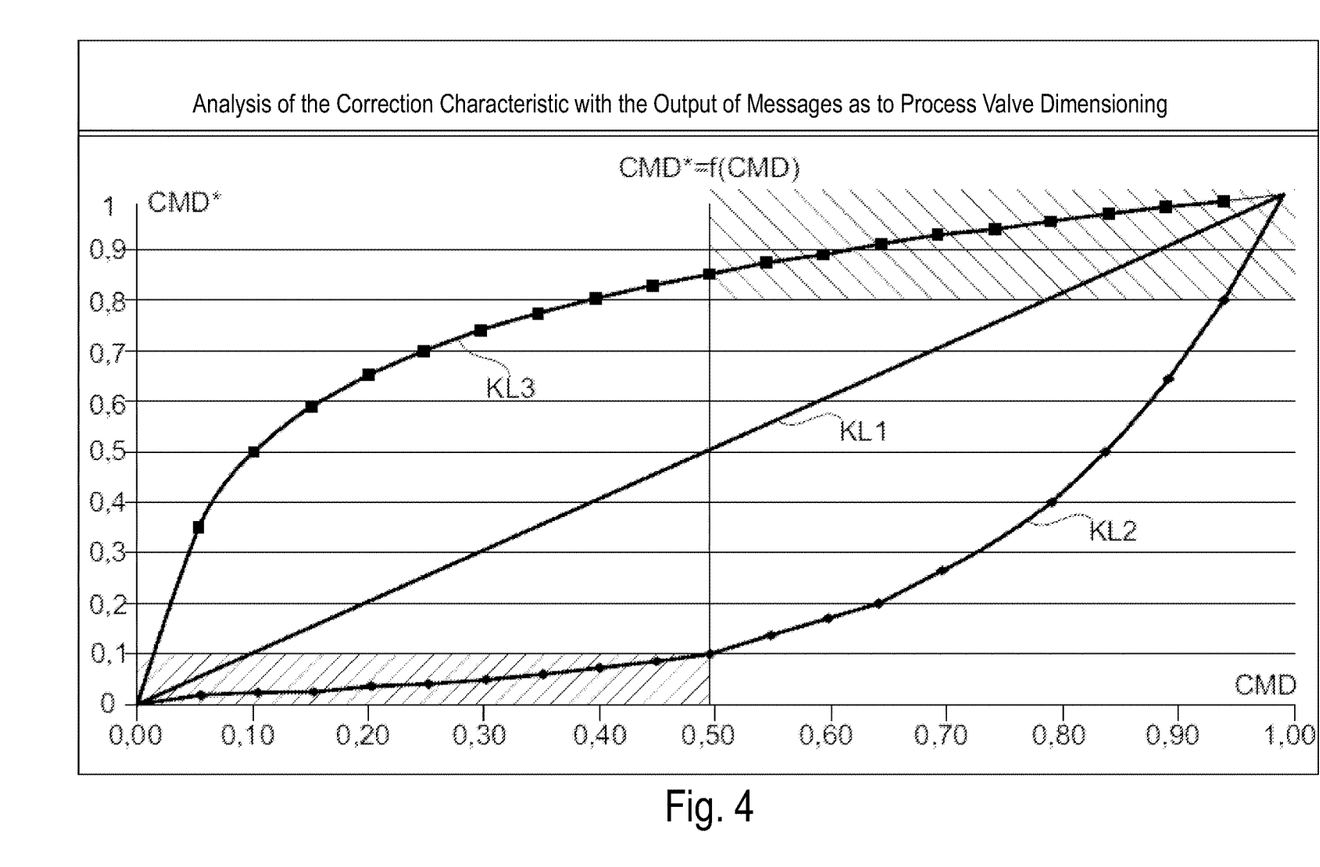
FIG. 4 shows a diagram for illustrating an analysis of the correction characteristic.

FIG. 4 shows a diagram in which the corrected position set values CMD* are represented as a function of the uncorrected position set values CMD for different situations which can then lead to corresponding messages. The position set values CMD are output by the tuning stage to drive the process valve from a closed (value 0.00) to an open (value 1.00) position. The corrected position set values CMD* have automatically been determined on the basis of the identified actual position values POS and the actual process values PV. The diagram shows three correction characteristics KL1, KL2 and KL3. KL1 is the optimum form of a characteristic. In this case, the process has already been completely linearized by mechanical elements (referred to as a so-called control cone below) and therefore does not require any further linearization. The characteristic KL2 relates to a case, in which for the position set values from 0.00 to 0.50 (0 to 50% opening of the process valve), all values of the corrected position set values CMD* are below a limit of 0.1 (10%) here. For this example case, an automatic output of a message could then take place. The content of this message could be that the process valve is oversized and/or even further that a control cone of equal percentage is to be used (exchange/modification of the process valve). The correction characteristic KL3 relates to a further error case. In this characteristic, for the position set values CMD from 0.50 to 1.00 (50% to 100%), all corrected position set values CMD* are above a limit of, e.g., 80% here. This behavior is also automatically detected as a wrong dimensioning. The message could then be that the process valve is undersized or that a linear control cone is to be used (exchange/modification of the process valve).

Figure 5:
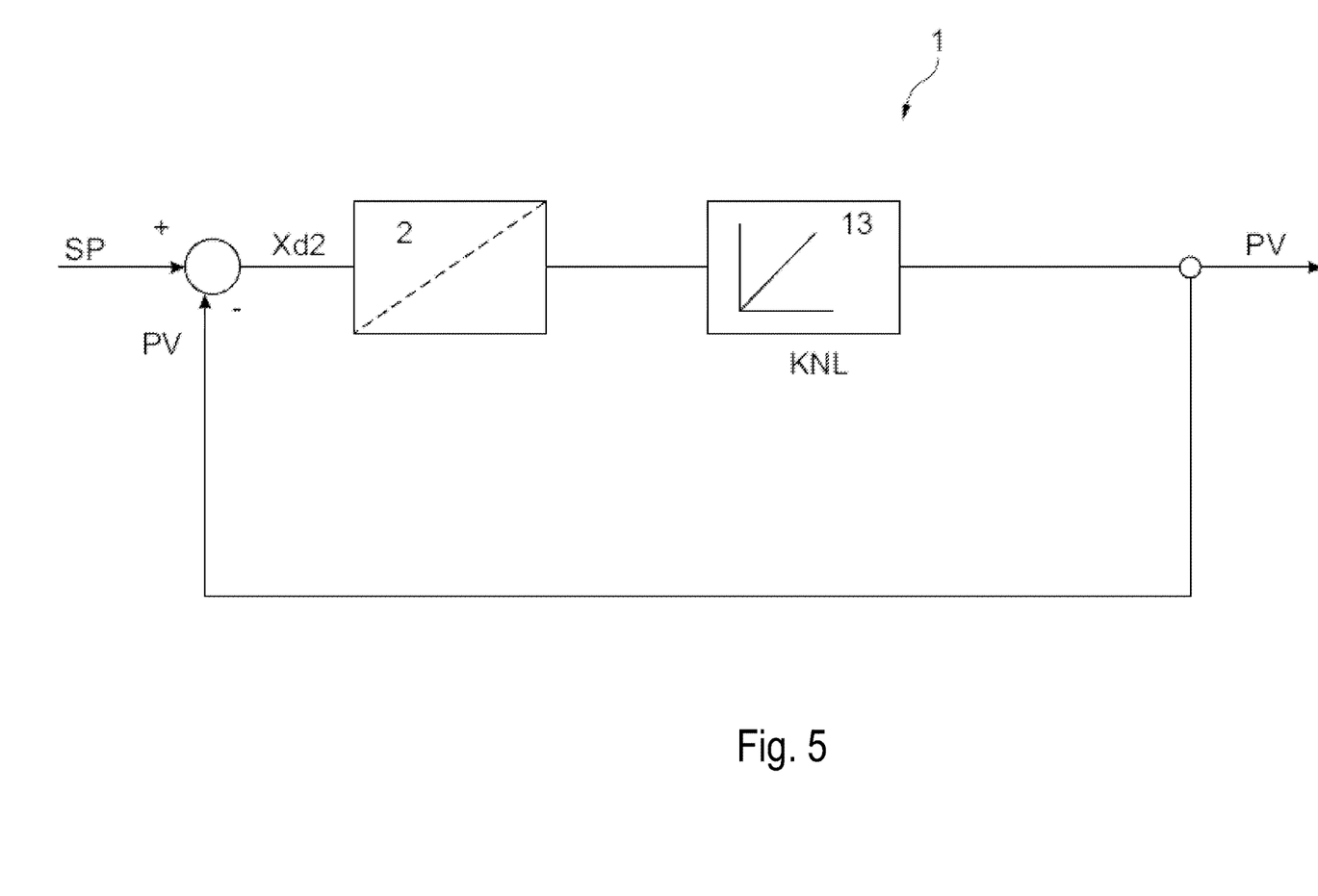
FIG. 5 shows a simplified diagram of an optimized process control loop according to aspects of the invention.

All in all, it results from the aspects according to the invention as described above the behavior shown in FIG. 5. Here, the process control loop 1 is entirely linearized. It includes the convention process controller 2 and, apart from that, a completely linear behavior including the position control loop 3, the process and all further blocks of FIG. 3. This is represented by stage 13.

Figure 6:
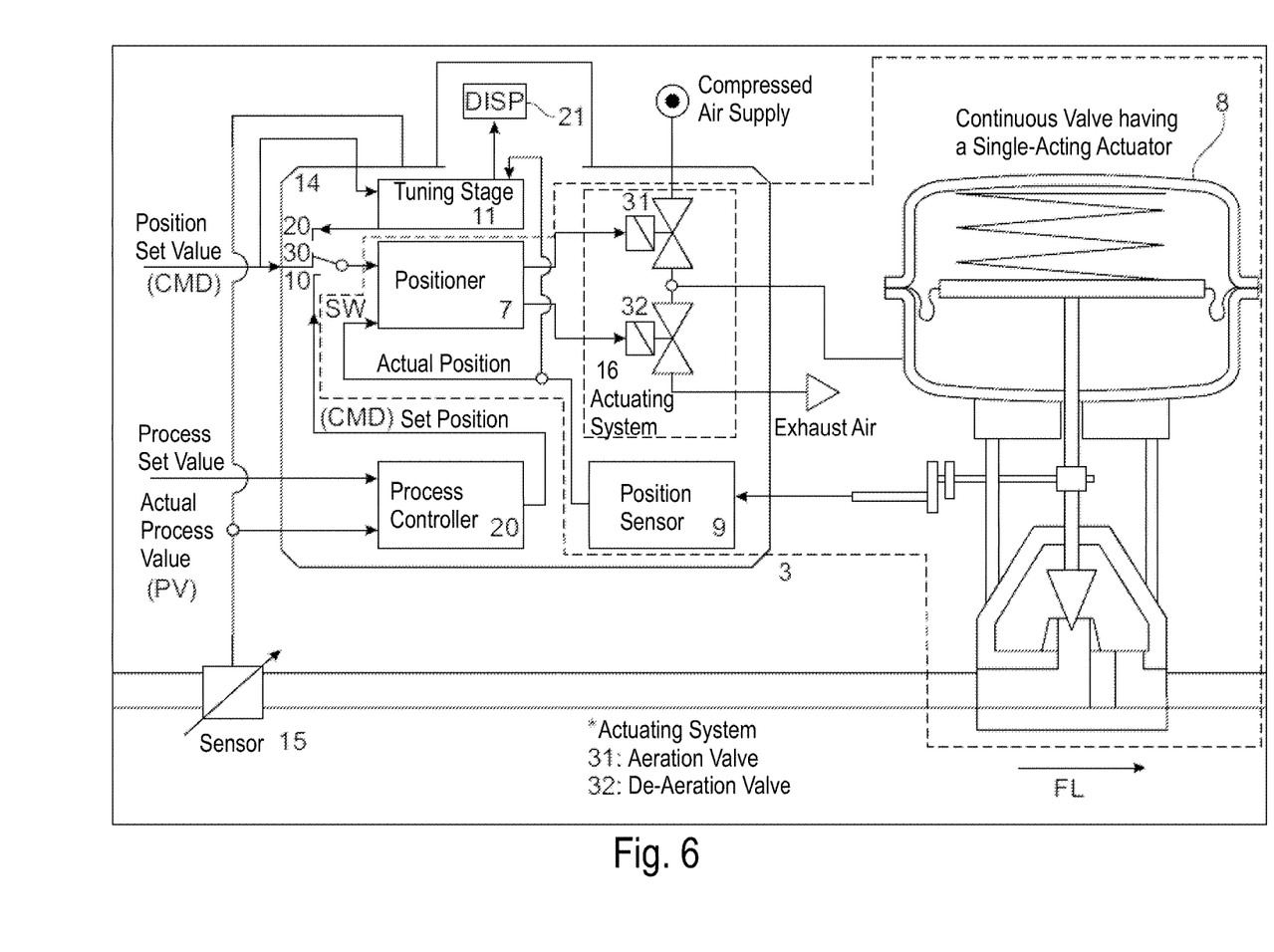
FIG. 6 shows a representation of an example embodiment of the invention.

FIG. 6 is a simplified schematic representation of an example embodiment of the invention. A device 14 for the closed-loop control of a process according to the different aspects of the invention is shown. The device can be, for example, a process control apparatus including the process controller 20 and the positioner 7. A process valve 8 is represented next to it which, in this case purely by way of example, is a continuous valve having a single acting actuator. The process valve controls a fluid flow FL the parameter of which (for example the flow rate) is detected by a sensor 15. This is then the actual process value PV. The device 14 according to this example embodiment of the invention includes the positioner 7 and optionally the process controller 20 and the position sensor 9, an actuating system 16, and the tuning stage 11. The positioner 7, the actuating system 16, and the position sensor 9 form along with the process valve 8 the position control loop. The actuating system can present valves for aerating and de-aerating 31, 32 the drive of the process valve 8. It converts the output quantity of the positioner into the corresponding control variables for the process valve 8. In this case, it is a pneumatic drive. Other drives can of course be considered. The position sensor 9 may also be placed outside the device 14. As already explained above, the position control loop 3 or the positioner 7 receives a position set value CMD from the process controller 20, or alternatively from the tuning stage 11. In the tuning procedure according to the invention, the input of the positioner 7 is switched away from the process controller 20 and towards the tuning stage 11 using the switch SW to obtain position set values CMD from the tuning stage 11. The switch has three positions 1a, 2a and 3a. In position 2a, the tuning stage 11 is coupled to the positioner 7. While a certain value range for the n position set values is passed through by the tuning stage 11, n actual process values PV are at the same time detected by the process valve 8 or the process 4 (not represented here) by the sensor 15, and pairs of actual position values and actual process values (POS, PV) are formed and stored. Accordingly, a storage is also provided in the device which is not represented separately. On the basis of these n pairs POS/PV, a complete correction characteristic is determined in the tuning stage 11 which is stored after the completion of the tuning procedure, such that the process controller 20 can correct the position set values therewith during normal operation to achieve a linear overall behavior. Here, the switch SW is in position 1a. In this way, the device 14 according to the invention adapts itself automatically and autonomously to the respective nonlinearities of the process and all further nonlinearities of the control and corrects them.

Furthermore, the switch SW can also be brought to position 3a. In this position, position set values can be output from the outside to the positioner. In this way, a tuning procedure and the calculation of correction values could also be realized outside the device 14. The correction values or the correction characteristic, or the parameters thereof can then be transmitted from outside to the process controller.

The tuning stage 11 can moreover be set up to analyze the identified value pairs of actual position values POS and actual process values PV and to derive, for example, wrong dimensionings of the process valve therefrom, as explained with respect to FIG. 4. To this end, the actual process values PV can for example be analyzed for specific actual position values POS or corrected position set values CMD*. A wrong dimensioning or other errors may, if necessary, be output to a user by a display 21, for example, or to a superordinate processing stage or to the user by a bus, such that these defects can be eliminated.

The invention claimed is:

1. A method for an open-loop or closed-loop control of a process using an actuator, a position sensor, a process valve, a process sensor, and a tuning stage, comprising:
   approaching n positions of the process valve;
   detecting associated n actual position values;
   detecting actual process values associated with each actual position value to thus obtain value pairs of actual position values and actual process values;
   determining correction values based on identified value pairs;
   calculating corrected position set values based on the correction values for compensating for nonlinearities of the process to achieve a linear overall behavior; and
   analyzing the actual position values, the position set values, the corrected position set values, and/or the actual process values associated therewith to evaluate different dimensioning aspects of the process valve and output an evaluation.

2. The method according to claim 1, further comprising:
   outputting n position set values from the tuning stage to the actuator in a range from a closed to an open position of the process valve.

3. A device for an open-loop or closed-loop control of a process, wherein the device includes:

an actuator;

a position sensor;

a process valve;

a process sensor; and a tuning stage, wherein n positions of the process valve are approached, associated actual position values are detected, and respective actual process values are detected for each corresponding actual position value to thus obtain value pairs of actual position values and actual process values, wherein correction values are calculated based on identified value pairs, and wherein position set values corrected with the correction values are determined to compensate for nonlinearities of the process to achieve a linear overall behavior, and wherein the actual position values, the position set values, the corrected position set values, and/or the actual process values associated therewith are analyzed to evaluate different dimensioning aspects of the process valve and output the evaluation.

4. The device according to claim 3, wherein n position set values can be output from the tuning stage to the actuator to approach the n positions of the process valve.

5. The device according to claim 3, wherein the device comprises a process controller and/or a positioner.

6. The device according to claim 5, wherein the process controller and the positioner are combined to a process control apparatus.

7. The device according to claim 5, including a switchover device to output the position set values from the tuning stage to the positioner, or to output corrected position set values from the process controller to the positioner.

8. The device according to any of claim 5, wherein the corrected position set values are output by the process controller.

* * * * *